Aug. 18, 1964  C. M. CRAIN ETAL  3,145,299
WAVEMETER
Filed June 29, 1960  2 Sheets-Sheet 2

INVENTORS
CULLEN M. CRAIN
CHARLES E. WILLIAMS

BY Louis Sheldon

ATTORNEY

3,145,299
WAVEMETER
Cullen M. Crain, Santa Monica, Calif., and Charles E. Williams, Garland, Tex., assignors, by mesne assignments, to the United States of America as represented by the Secretary of the Navy
Filed June 29, 1960, Ser. No. 39,751
1 Claim. (Cl. 250—39)

This invention relates to microwave-frequency wavemeters.

Due to the presence of varying amounts of moisture in the air, and variations in atmospheric pressure, the normal changes in refractive index of the air in the resonator of an unsealed wavemeter cause the resonant frequency of the resonator to vary as much as 400 parts in a million. It is often desirable to use a microwave-frequency wavemeter with which wavelength changes may be read accurately to one part in a million or with greater accuracy, and which is tunable over a range of a fraction of a percent of the nominal resonant wavelength. For such accuracy, therefore, the wavemeter must be sealed against moisture and dry air.

Prior types of sealed cavity wavemeters have been found incapable of the precision and sensitivity noted above, and for other reasons have proved unsatisfactory.

One sealed cavity wavemeter heretofore in use employs a plunger in the form of a bellows actuated toward and away from the opposite wall of the cavity. An important drawback of such a construction is that a bellows is subject to aging and fatigue, so that errors will eventually creep in and thus the bellows type is of limited life and not reliable for sustained accuracy.

Another type of sealed cavity wavemeter heretofore in use employs a complex pressure seal.

It is sometimes desirable to selectively employ, with the same sealed cavity wavemeter, plungers of different diameters to obtain various degrees of sensitivity. This cannot be done with past sealed cavity wavemeters without unsealing the cavity.

It is an object of the invention to provide a simple, highly precise and sensitive sealed cavity resonator characterized in that all sealing parts of the sealed structure are stationary.

A further object is to provide a sealed cavity resonator having a plunger which forms no part of the sealing means.

Another object is to provide a sealed cavity resonator in which the plunger can be replaced with one of different diameter without requiring unsealing of the resonator.

It is also an object to provide a simple tunable wavemeter sensitive to extremely small frequency changes and independent of atmospheric moisture and pressure conditions.

Further objects and advantages of the invention will appear as the description proceeds.

The invention will be better understood on reference to the following description and the accompanying drawing, wherein:

FIGS. 3 and 4 show plungers of respectively larger and smaller diameters than that in FIG. 1, mounted selectively on the same micrometer spindle.

Figure 1:
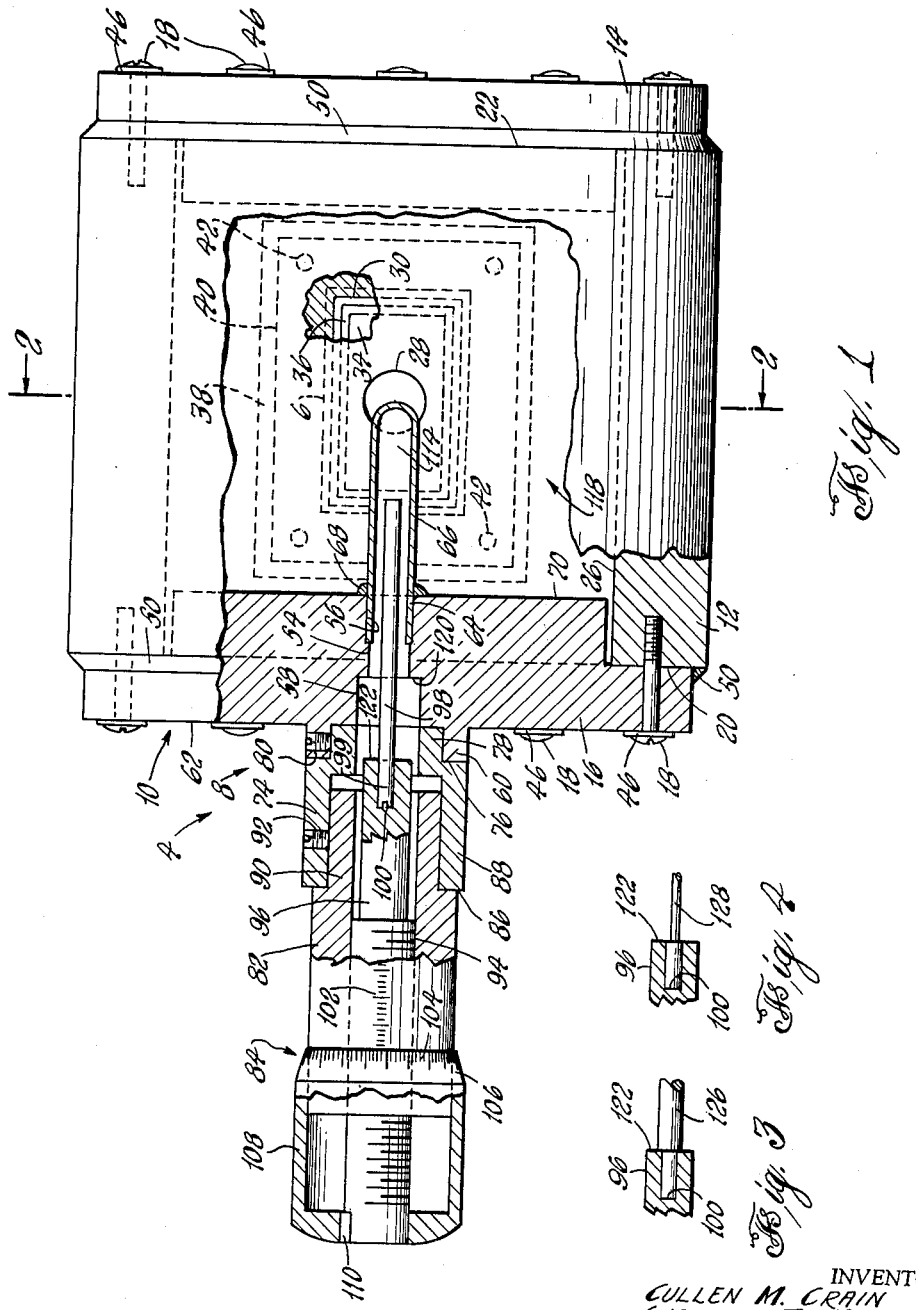
FIG. 1 is a longitudinal sectional view of the wavemeter.
Figure 2:
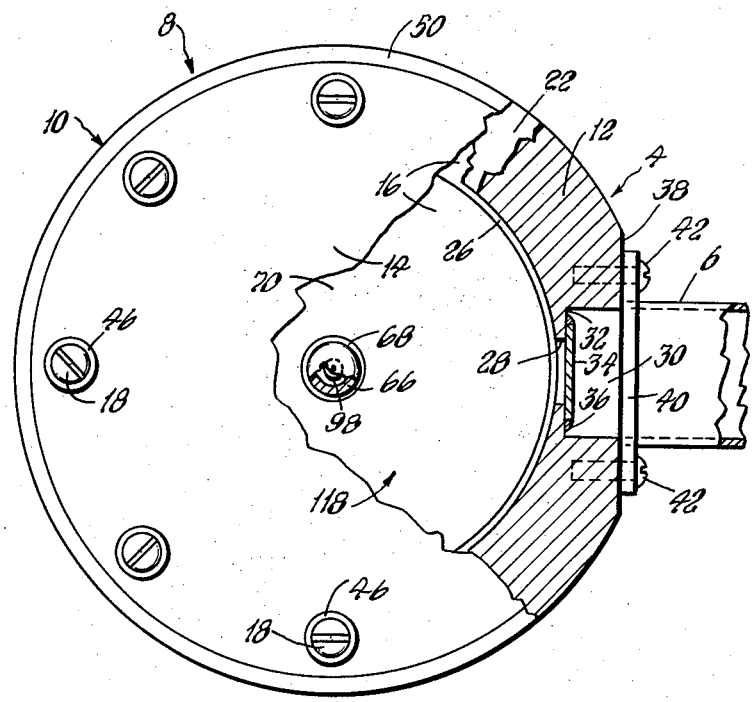
FIG. 2 is a transverse sectional view taken as indicated at 2—2 in FIG. 1.

Referring now more particularly to the drawing, disclosing an illustrative embodiment of the invention, there is shown at 4 an assembly of a waveguide portion 6 with a wavemeter 8 including a resonance chamber 10 comprising a metal cylinder 12 and two metal end plates 14 and 16 secured as by screws 18 to the respective cylinder ends 20 and 22.

The cylinder bore wall 26 is interrupted only by an iris 28, which opens externally into a rectangular pocket 30 on whose preferably flat base 32 is positioned a mica or other suitable moisture- and air-tight dielectric plate 34 completely covering the iris, the entire periphery of the plate being secured and sealed at 36 to the base. As shown at 38, the cylinder 12 is preferably flattened at the outer end of the pocket 30 to receive the flange 40 of the waveguide portion 6, whose inside surfaces are flush with the pocket surfaces, the flange being secured to the cylinder as by screws 42.

The screws 18 are sealed at 46 to the respective end plates 14 and 16, and the plates are circumferentially sealed at 50 to the respective cylinder ends 20 and 22.

The end plate 14 is imperforate except for its screw-receiving holes.

The end plate 16 is imperforate except for its screw-receiving holes and a coaxial opening comprising an intermediate bore 54 terminating at inner and outer counterbores 56 and 58, and has a coaxial ring boss 60 interrupting its outer face 62. The open end portion 64 of a quartz or other suitable moisture- and air-proof dielectric thimble 66 is fitted in the inner counterbore 56 and circumferentially secured and sealed at 68 to the inner face 70 of the plate 16.

The end plates 14 and 16 project somewhat into the cylinder 12 and in spaced relation to the cylinder bore wall 26 in accordance with standard practice to dampen modes other than the resonant mode for which the resonator is designed.

It is apparent from the foregoing that the space defined by the cylinder 12, the mica plate 34, the end plates 14 and 16, and the outer surface of the thimble 66 is fixed and completely moisture-sealed and sealed against dry air so that it is not subject to air pressure variation.

A sleeve 74 abuts the end face 76 of the boss 60 and has a reduced extension 78 snugly fitted in the boss and there securely held as by one or more set screws 80. The barrel 82 of a micrometer 84 abuts the outer end face 86 of the enlarged sleeve portion 88 and has an extension 90 of reduced outer circumference snugly fitted in said sleeve portion and there securely held as by one or more set screws 92. Threaded at 94 in the barrel 82 is a micrometer spindle 96 to which a tuning plunger 98 is suitably secured, as by having its outer end portion 99 press-fitted in an inner end socket 100 of the spindle, the plunger passing through the bore 54 and movable in the thimble 66 toward and away from the end plate 14 to a position of resonance. The barrel 82 bears a micrometer scale 102 cooperating with a peripheral scale 104 on the adjacent end portion 106 of the micrometer knob 108 fixed as at 110 to the spindle 96. The scaling is preferably such as to read directly in wavelength.

The frequency at which the chamber 10 is resonant depends on the distance between the end plate 14 and the plunger 98, the resonant frequency being of course a minimum when the plunger is no closer than the end plate 16 to the end plate 14. In accordance with standard practice, energy from the main wave guide section (not shown) is branched off into a lossy wave guide portion (not shown), whence it enters the wave guide portion 6 in attenuated form and passes through the dielectric plate 34 and iris 28 into the resonance chamber 10. Further in accordance with standard practice a D.C. microvoltmeter (not shown) and a crystal (not shown) are connected so that the microvoltmeter will indicate the voltage of the energy entering the chamber 10. When this voltage is a maximum (or a minimum), the chamber 10 resonates. Accordingly the operator adjusts the plunger 98 to and fro until the microvoltmeter shows that the chamber 10 is in resonance, so that the reading then given by the micrometer is the wavelength of the energy in the waveguide.

The diameter of the thimble 66 is so small that the variable volume of the space 114 in the thimble between the probe 98 and the closed thimble end 116 is, at its maximum, negligible compared to the volume of the sealed portion or compartment 118 of the cavity. Hence the effect of any moisture or change in air pressure in the space 114 (which of course decreases in volume with penetration by the plunger 98) on the resonance of the chamber 10 as a whole is negligible.

Inasmuch as the probe 98 cannot undergo loss of effectiveness by reason of use or aging, the wavemeter may be used indefinitely and operate with sustained accuracy without replacement of any part of the chamber 10. Moreover, if it is desired to employ a plunger of less or greater diameter than the plunger 98, in order to render the wavemeter 8 more sensitive or less sensitive, as the case may be, this can be done without disturbing the sealed compartment. It can be done by replacing the spindle 96 and plunger 98 with another spindle to which is attached a plunger of the desired diameter. Of course the maximum diameter of plunger usable with the chamber 10 must be movable in the tube or thimble 66. Or, if desired, all plungers to be selectively used in a given wavemeter made in accordance with the invention may be made with their outer end portions of the same diameter so, as to fit equally well in the spindle socket 100. Plungers 126 (FIG. 3) and 128 (FIG. 4) are shown as examples. With such an arrangement all that is necessary to replace a plunger is to pull it out of the spindle socket and press-fit another in its place.

The base 120 of the counterbore 58 serves as a stop against which the spindle end 122 will abut when the plunger 98 is preferably somewhat short of the thimble end 116, so that under no circumstances can the plunger subject the thimble 66 to stress.

The thimble 66 may be made of any desired length, and the spindle 96 will be correspondingly constructed or arranged to be stopped so that the plunger cannot stress the thimble.

The sealant 36, 46, 50, and 68 may be "Glyptol" or other suitable substance which secures parts together and seals them against passage of moisture and dry air therebetween.

A sealed cavity resonator constructed in accordance with the invention is applicable to all frequencies where cavity resonators are used, and can be tuned over various ranges of frequency up to as high as 0.2% and as low as 0.0002% with a resolution of better than 0.5% of the tuning range.

Obviously many modifications and variations of the invention are possible in the light of the above teachings. It is therefore to be understood that within the scope of the appended claim the invention may be practiced otherwise than as specifically described.

We claim:

In a wavemeter for use with a radar installation, a resonator chamber, a dielectric thimble dividing the cavity of the chamber into first and second spaces, the chamber having means for admitting attenuated high frequency electromagnetic energy into the first space, means sealing the first space against entry of moisture and dry air, a metal plunger reciprocable in the thimble, and means connected to the chamber and plunger for indicating the wavelength of the energy in the cavity, said indicating means being detachable from the chamber and having means replaceably mounting the plunger so that the plunger is replaceable with one of different diameter which can be accommodated by the thimble, without disturbing the sealing means.

References Cited in the file of this patent
UNITED STATES PATENTS

| | | |
|---|---|---|
| 2,259,690 | Hansen | Oct. 21, 1941 |
| 2,338,306 | Smyth | Jan. 4, 1944 |
| 2,404,116 | Wolowicz | July 16, 1946 |
| 2,445,811 | Varian | July 27, 1948 |
| 2,467,104 | White | Apr. 12, 1949 |
| 2,503,256 | Ginzton | Apr. 11, 1950 |
| 2,578,699 | Hansen | Dec. 18, 1951 |
| 2,605,459 | Cook | July 29, 1952 |
| 2,749,523 | Dishal | June 5, 1956 |
| 2,873,430 | Tomiyasu | Feb. 10, 1959 |

OTHER REFERENCES

Technique of Microwave Measurement, vol. II of the Radiation Laboratory Series, pages 328 to 330 cited.

Electronic Design, Jan. 1, 1956, pages 42, 43.

Bussey et al.: "Cavity Resonators for Dielectric Spectroscopy of Compressed Gases," Rev. Sci. Inst., 30, 800–804, September 1959.